United States Patent
Lee et al.

(10) Patent No.: US 7,477,599 B2
(45) Date of Patent: Jan. 13, 2009

(54) SYSTEM AND METHOD FOR GUARANTEEING QUALITY OF SERVICE IN IP NETWORKS

(75) Inventors: Wang Bong Lee, Daejeon (KR); Jin Ho Hahm, Daejeon (KR); Young Sun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 820 days.

(21) Appl. No.: 10/979,997

(22) Filed: Nov. 2, 2004

(65) Prior Publication Data

US 2005/0135243 A1   Jun. 23, 2005

(30) Foreign Application Priority Data

Dec. 18, 2003   (KR) ...................... 10-2003-0093484

(51) Int. Cl.
  *H04L 12/26* (2006.01)
(52) U.S. Cl. ..................................... 370/230.1; 370/232
(58) Field of Classification Search ................. 370/230, 370/230.1, 232, 412
  See application file for complete search history.

(56) References Cited

U.S. PATENT DOCUMENTS

| | | | |
|---|---|---|---|
| 7,020,143 B2* | 3/2006 | Zdan ..................... | 370/395.21 |
| 7,330,433 B2* | 2/2008 | Shao et al. ................... | 370/235 |
| 2002/0181462 A1 | 12/2002 | Surdila et al. | |
| 2004/0125815 A1* | 7/2004 | Shimazu et al. ............. | 370/411 |
| 2004/0177087 A1* | 9/2004 | Wu et al. .................... | 707/102 |

FOREIGN PATENT DOCUMENTS

KR   1020030056304   7/2003

OTHER PUBLICATIONS

Yongxing Jia et al., "A New Architecture of Providing End-To-End Quality-Of-Service For Differentiated Services Network," 0-7803-7225-5/1/01 (c) 2001 IEEE (pp. 1450-1455).

* cited by examiner

*Primary Examiner*—Melvin Marcelo
(74) *Attorney, Agent, or Firm*—Blakely, Sokoloff, Taylor & Zafman LLP

(57) ABSTRACT

The system of the present invention guarantees quality of service with respect to packets transmitted/received between an external network capable of providing differentiated services and a home network. The system includes a packet classifier, a marker, a priority class queue, a scheduler and a token bucket. The packet classifier classifies the packets according to addresses and traffic types. The marker allocates information on priorities to packets transmitted from the home network to the external network. The priority class queue has a plurality of queues classified according to the priorities. The scheduler services packets stored in the priority class queue according to the priorities. The token bucket drops packets, bandwidths of which are above a preset maximum bandwidth, when the packets are generated.

17 Claims, 5 Drawing Sheets

SYSTEM AND METHOD FOR GUARANTEEING QUALITY OF SERVICE IN IP NETWORKS

BACKGROUND OF THE INVENTION

1. Field of the Invention

The present invention relates, in general, to a system and method for guaranteeing quality of service in networks and, more particularly, to a system and method for guaranteeing quality of service with respect to packets transmitted/received between a network capable of providing differentiated services and a home network.

2. Description of the Related Art

Generally, all conventional application programs in the Internet using Internet Protocol (IP) have provided only simple best-effort services. Further, a precedence sub-field and a TOS sub-field exist in a Type Of Service (TOS) region within an IPv4 header so as to provide services corresponding to respective IP datagrams. However, an Internet router providing only best-effort services does not use such sub-field information. Such a conventional Internet environment cannot satisfy various demands of Internet users any longer. Therefore, in order to satisfy the various service demands of Internet users, the provision of a guaranteed Quality of Service (QoS) in the Internet is needed.

Currently, in order to provide various services and guaranteed QoS, various research has been carried out all over the world. The Internet Engineering Task Force (IETF) has introduced various service models and mechanisms providing QoS in response to the demands of the Internet users. For remarkable mechanism of the introduced models, there are Integrated Services (IntServ) and Differentiated Services (DiffServ). The IntServ mechanism reserves end-to-end resources using Resource Reservation Protocol (RSVP) used to reserve resources, and provides QoS to users. However, since the RSVP reserves resources for respective flows, information and states required for resource reservation should be maintained for all flows, so that it is difficult to accommodate the RSVP in a large-scale network. That is, the RSVP is limited in flows, which can be managed by a system on a RSVP path. However, the DiffServ mechanism does not reserve resources for respective flows, but provides differentiated services to users in such a way that, if an edge node classifies data packets according to QoS required by users, a core node of the network differentially processes the classified data packets. Such a DiffServ mechanism improves the priority indication services of IPv4 defined in RFC791, and utilizes basic paradigm capable of providing various QoSs in the Internet using the defined services. Services can be the important characteristics of packet transmission, such as qualitative and statistic periods, throughput, delay, jitter and loss, in a set of one or more unidirectional paths within the network, or can be standardized by relative priorities to access network resources. The differentiation of services is required to allow differentiated prices of Internet services, satisfy various expectations of the users or accommodate different applications.

Services are provided to sets of traffic. For this purpose, a set of useful end-to-end services, which can be required by application programs using specific QoS, is defined in advance in the DiffServ. This set of services is called Per-Hop Behavior (PHB). PHB indicates that resources, such as buffers of routers or bandwidths, are allocated among competing traffic streams. Currently, IETF defines Expedited Forwarding (EF) PHB and Assured Forwarding (AF) PHB as newly differentiated forwarding schemes in a single router, besides default PHB for conventional best-effort services. End-to-end differentiated services are provided by these PHBs and a specific traffic mediator.

In a network providing DiffServ, traffic streams are classified and marked by routers on a progressing path so as to perform a special per-hop transmission. At this time, traffic streams are processed so that traffic control functions, such as complicated classification, marking, policing and shaping, are mainly performed in edges or hosts of the network, and so that input packets are processed depending on contracted services on the basis of marked values within the network. Therefore, the DiffServ mechanism is advantageous in that there is no need to maintain states and information for respective flows in a core portion of the network having a large number of flows. Accordingly, the DiffServ mechanism is advantageous in that the problem of scalability occurring in the IntServ using RSVP can be solved, but it is problematic in that, if the number of users and the amount of traffic flowing into the network increase, a load to be processed by an edge router increases, thus deteriorating the reliability of a QoS guarantee.

SUMMARY OF THE INVENTION

Accordingly, the present invention has been made keeping in mind the above problems occurring in the prior art, and an object of the present invention is to provide a system and method for guaranteeing Quality of Service (QoS) in a Differentiated services (DiffServ) network, which reduces a load to be processed by an edge router and efficiently processes traffic in the network providing DiffServ, thus improving the reliability of a QoS guarantee.

In order to accomplish the above object, the present invention provides a system for guaranteeing quality of service with respect to packets transmitted/received between an external network capable of providing differentiated services and a home network, comprising a packet classifier for classifying the packets according to addresses and traffic types; a marker for allocating information on priorities to packets transmitted from the home network to the external network; a priority class queue having a plurality of queues classified according to the priorities; a scheduler for servicing packets stored in the priority class queue according to the priorities; and a token bucket for dropping packets, bandwidths of which are above a preset maximum bandwidth, when the packets are generated.

Preferably, the information on the priorities may include information used to intercept packets, the bandwidths of which are above the maximum bandwidth; and information used to necessarily transmit packets, bandwidths of which are equal to or below a minimum bandwidth to a correspondent user so as to provide guaranteed services.

Preferably, the packets may include upstream packets transmitted from the home network to the external network and downstream packets transmitted from the external network to the home network, the upstream packets may have information related to the maximum bandwidth or minimum bandwidth; and the downstream packets may have information related to the maximum bandwidth.

Preferably, the downstream packets for guaranteed services may be implemented so that, if a bandwidth of a sum of the downstream packets is above the downstream maximum bandwidth, use of a specific application is stopped and then the bandwidth of the sum of the downstream packets is controlled to be equal to or below the downstream maximum bandwidth.

Preferably, the information on the priorities may include information used to identify a protocol, a transmission IP address, a transmission port or a default value.

Preferably, the information on the priorities may be included in Differentiated Services Code Point (DSCP) codes.

Preferably, the system for guaranteeing quality of service may further comprise an edge router for examining the priority information allocated by the marker and then transmitting the packets to a core router according to the priorities.

Preferably, the system for guaranteeing quality of service may further comprise means for providing information of traffic processed for a predetermined period to a user through the Web.

Preferably, the means may include, so as to monitor states of upstream traffic transmitted from the home network to the external network, means UpHR(GR) for representing an amount of traffic marked with a guaranteed service and transmitted to the external network; means UpHR(BE) for representing an amount of traffic marked with a best-effort service and transmitted to the external network; means UpHR(D) for representing an amount of traffic not transmitted to the external network but dropped; means UpHR for representing a total amount of traffic generated by the home router; and means UpHR (S) for representing a total amount of traffic serviced at the home router.

Preferably, the means may include, so as to monitor states of downstream traffic transmitted from the external network to the home network, means DnHR (S) for representing an amount of traffic transmitted to lower IP terminals; means DnHR (D) for representing an amount of traffic not transmitted to lower IP terminals, but dropped; and means DnHR for representing a total amount of traffic flowing into the home router.

In addition, the present invention provides a method of guaranteeing quality of service with respect to packets transmitted/received between an external network capable of providing differentiated services and a home network, comprising the steps of classifying packets transmitted from the home network to the external network according to addresses and traffic types; allocating information on priorities to the packets; inputting the packets to a priority class queue having a plurality of queues classified according to the priorities; and servicing the packets stored in the priority class queue according to the priorities.

Preferably, the method of guaranteeing quality of service may further comprise the step of dropping packets, bandwidths of which are above a preset maximum bandwidth, when the packets are generated.

Preferably, the information on the priorities may include information used to intercept packets, bandwidths of which are above a maximum bandwidth; and information used to necessarily transmit packets, bandwidths of which are equal to or below a minimum bandwidth, to a correspondent user so as to provide guaranteed services.

Preferably, the packets may include upstream packets transmitted from the home network to the external network and downstream packets transmitted from the external network to the home network; the upstream packets may have information related to a maximum bandwidth or minimum bandwidth; and the downstream packets may have information related to a maximum bandwidth.

Preferably, the method of guaranteeing quality of service may further comprise the step of stopping using a specific application and then controlling a bandwidth of a sum of the downstream packets for guaranteed services to be equal to or below the downstream maximum bandwidth if the bandwidth of the sum of the downstream packets is above the downstream maximum bandwidth.

Preferably, the information on the priorities may include information used to identify a protocol, a transmission IP address, a transmission port or a default value.

Preferably, the information on the priorities may be included in Differentiated Services Code Point (DSCP) codes.

Preferably, the method of guaranteeing quality of service may further comprise the step of providing information of traffic processed for a predetermined period to a user through the Web

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
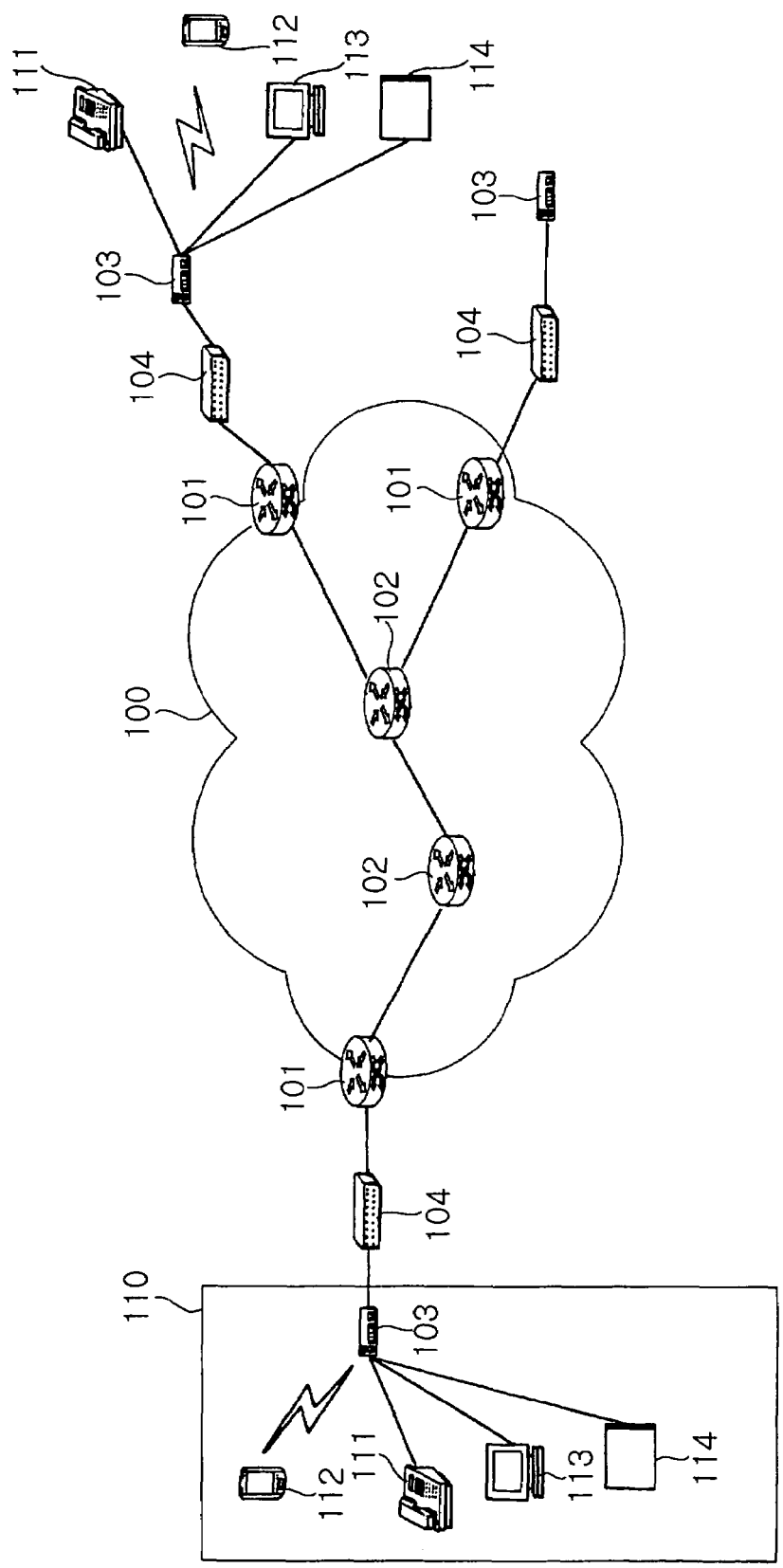
FIG. 1 is a view showing the construction of a network according to an embodiment of the present invention.

Hereinafter, embodiments of the present invention will be described in detail with reference to the attached drawings. Reference now should be made to the drawings, in which the same reference numerals are used throughout the different drawings to designate the same or similar components. In the present specification, if it is determined that a detailed description of a related art or construction unnecessarily makes the gist of the present invention unclear, the detailed description thereof will be omitted.

FIG. 1 is a view showing the construction of a network according to an embodiment of the present invention.

Referring to FIG. 1, the network of the present invention includes a Differentiated Services (DiffServ) Network 100 capable of providing DiffServ and home networks 110.

The DiffServ network 100 includes a plurality of edge routers 101 and a plurality of core routers 102. The edge routers 101 are connected to the home networks 110 through Ethernet switches 104.

Each of the home networks 110 is comprised of home devices 111 to 114 and a home router 103. The home devices 111 to 114 are connected to the external network 100 through the home router 103. Such home devices 111 to 114 may include, for example, the Internet phone 111, the hand held Personal Computer (PC) 112, the multimedia PC 113 and the digital television 114. The network of the present invention can be implemented as an IPv4 or IPv6 network, or a network in which the IPv4 and IPv6 networks coexist.

In the embodiment of the present invention, the following values can be determined by the home router 103 as Service Level Agreement (SLA) items so as to guarantee the quality of traffic. First, a maximum bandwidth (hereinafter referred to as "Max BW", unit: Mbps) and a minimum bandwidth (hereinafter referred to as "Min BW", unit: Mbps) can be set with respect to upstream traffic transmitted from the home network 110 to the external network 100. Further, Max BW (unit: Mbps) can be set with respect to downstream traffic transmitted from the external network 100 to the home network 110.

After such initial values are set (off-line or on-line) by a service provider at an Internet service opening stage, a subscriber can access a network manager of the service provider on-line, and then change the initial values in real-time using a SLA setting function. The above-described SLA items indicate that subscriber traffic, the bandwidth of which is equal to or below the Min BW, should be transmitted to a correspondent subscriber, and subscriber traffic, the bandwidth of which exists between the Min BW and the Max BW, is output from the home router 103 but may be transmitted to a correspondent subscriber or dropped during transmission depending on the conditions of the network. Further, subscriber traffic, the bandwidth of which is above the Max BW, is prohibited from being output from the home router 103. At this time, the upstream Min BW value indicates that, if the user outputs data at a bandwidth equal to or below the upstream Min BW, there is a high probability that the data is transmitted to a correspondent subscriber. In the Internet, traffic quality is influenced by the operating states of local networks and core networks and the operating states of correspondent subscriber networks. Therefore, the determination of upstream Max BW and Min BW and downstream Max BW promised to the user to guarantee contracted traffic quality is performed on the basis of service provider's experiences in continuously monitoring the operation of the network.

With respect to output data, the bandwidth of which is equal to or below the upstream Min BW value, the home router marks "guaranteed service or high priority" on a corresponding IP packet and an intermediate network primarily processes IP the packet, thus enabling the IP packet to be transmitted to a correspondent subscriber without loss. However, if a loss occurs in the guaranteed data, information related to the data loss is accumulated, so that the information can be reflected on a next SLA contract with subscribers (the corresponding subscriber and other subscribers). With respect to output data, the bandwidth of which is within a range between the upstream Min BW and the upstream Max BW, the home router 103 marks "best-effort service or low priority" on a corresponding IP packet, and the intermediate network endeavors to transmit the corresponding packet, but a data loss may occasionally occur. Output data, the bandwidth of which is above the upstream Max BW value, is not transmitted to the network, but dropped.

The setting of the downstream Max BW value indicates that it allows a subscriber to use a bandwidth corresponding to the maximum value. Therefore, the home router 103 accommodates only packets within an allowance in packets arriving at the home router 103, and drops packets exceeding the allowance. This operation is performed to realize a business model of the service provider. Even within the downstream BW, the user can allocate priority to traffic. That is, the designation of classes and data rate per class is possible. Similar to this, if the bandwidth of a total amount of traffic is above the Max BW, the home router 103 primarily drops the traffic of a class transmitting data at a rate greater than a designated rate.

There may occur a case where the bandwidth of the sum of guaranteed service packets received from several correspondent subscribers is above the downstream Max BW value of a destination. In this case, even though the packets are classified as the guaranteed service packets, the packets may be dropped by the home router. At this time, since the subscriber recognizes which service is currently used, the subscriber stops using a specific application, thus compulsorily controlling the bandwidth of the sum of the guaranteed service packets to be equal to below the downstream Max BW. The subscriber can monitor the states of traffic transmitted and received by the subscriber in the form of a graph on the basis of data monitored by the home router 103 thereof. This process is executed by allowing the subscriber to access a Web server of the home router through the Web.

Figure 2:
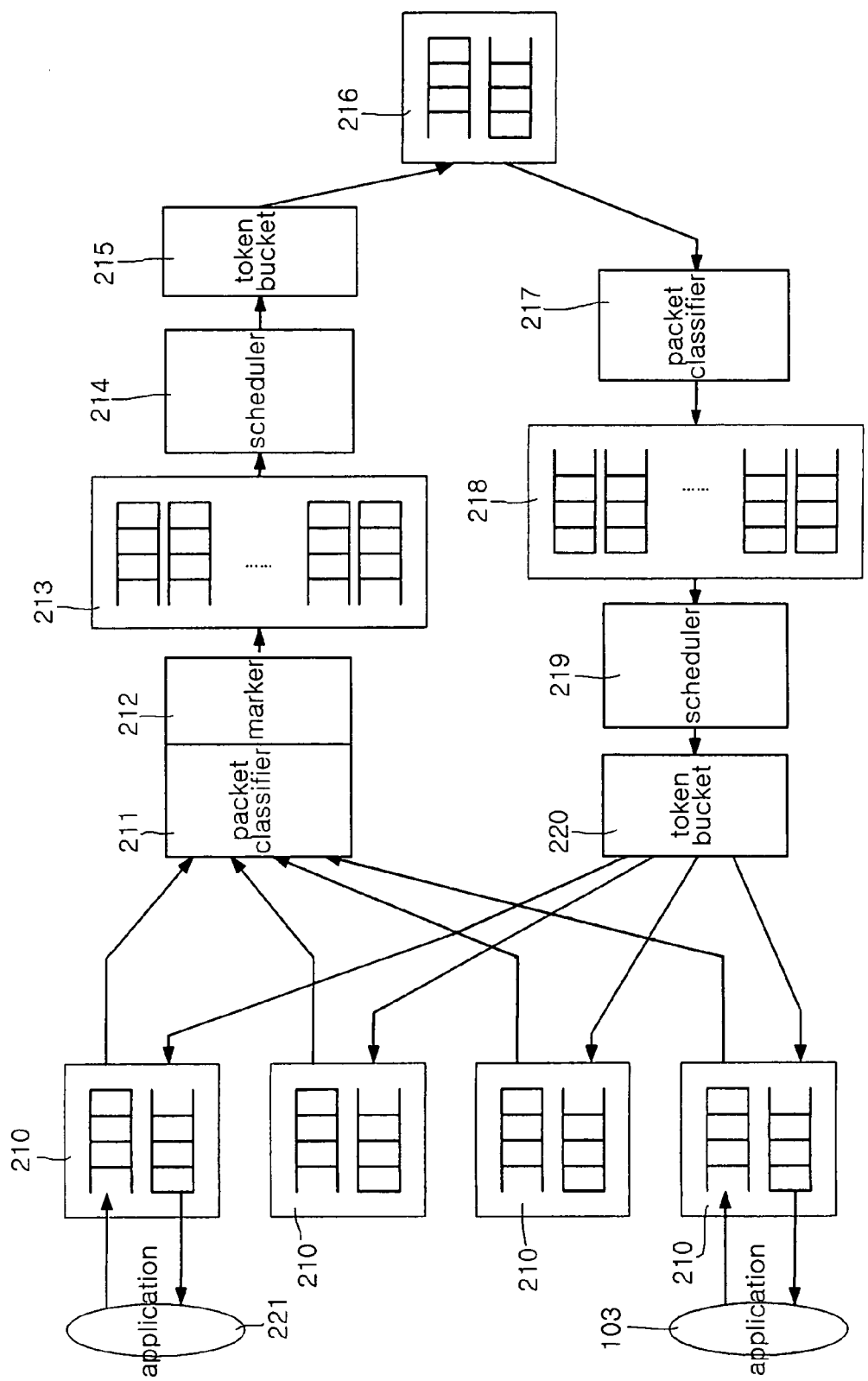
FIG. 2 is a view showing the detailed construction of a home router according to an embodiment of the present invention.

FIG. 2 is a view showing the detailed construction of the home router according to an embodiment of the present invention.

Referring to FIG. 2, the home router 103 of the present invention includes Ethernet 10/100 ports and wireless Institute of Electrical and Electronics Engineers (IEEE) 802.11b ports 210, packet classifiers 211 and 217, a marker 212, priority class queues 213 and 218, schedulers 214 and 219, token buckets 215 and 220, and a Wide Area Network (WAN) port 216. The home router 103 distributes, processes and controls traffic through the following construction and operation, thus guaranteeing a quality of service.

The packet classifier 211 classifies upstream traffic generated by applications 221 according to addresses and traffic types. Thereafter, the marker 212 sets Differentiated Services Code Point (DSCP) values capable of being used in the network 100 depending on priorities with respect to the upstream traffic, and transmits the DSCP values to the priority class queue 213. The priority class queue 213 may include a maximum of eight queues, which have respective priorities and can be classified into high priority (or guaranteed service) and low priority (best-effort service). Such priorities are determined by the user and a network manager. Further, the scheduler 214 provides packets stored in the priority class queue 213 depending on the priorities set by the DSCP. In this case, the scheduler 214 can use generally known scheduling algorithms, such as Weighted Fair Queuing (WFQ), Deficit Round Robin (DRR) and Weighted Round Robin (WRR). The token bucket 215 drops traffic when the traffic, the bandwidth of which is above the Max BW determined by the user and the network manager, is generated. Further, the upstream traffic is transmitted to the external network 100 through the WAN port 216 connected to the edge router 101.

In contrast, downstream traffic flowing into the WAN port 216 from the external network 100 are classified according to addresses and traffic types by the packet classifier 217, and transmitted to the priority class queue 18. Then, the scheduler 219 provides packets stored in the priority class queue 218 depending on the priorities of the packets. Thereafter, the token bucket 220 drops packets when the packets, the bandwidths of which are above the downstream Max BW determined by the user and the network manager, flow from the external network 100.

The number of priority classes is eight in total in the embodiment of the present invention, which can be set depending on traffic types. The traffic types may include real-time traffic, Web traffic, file traffic and mail traffic. The user can set traffic types using the Web, and the network manager can set DSCP values. Further, a user skilled in real-time services can set even detailed items, such as Voice over Internet Protocol (VoIP) and video services. The priorities set in this way have initial values, which are later changed by the user. Generally, the priorities can be set so that audio and video data, requiring real-time processing, have priorities higher than those of non real-time data, such as files or mails.

The following Table 1 shows an example of the setting of the priority classes of upstream or downstream traffic. Referring to Table 1, in the case of upstream traffic, classes 1 and 2 are identified by Real-time Protocol (RTP) and Simple Network Management Protocol (SNMP), on which allocation rates of 30% and 10% are set, respectively, and on which DSCP values of 100001 and 100010 are set, respectively. Further, classes 3 and 4 are identified by transmission IP addresses, on which an allocation rate of 10% is set and on which DSCP values of 100011 and 100101 are set, respectively. Further, classes 5, 6 and 7 are identified by transmission ports, on which an allocation rate of 10% is set, and on which DSCP values of 000110, 000111 and 001001 are set, respectively. Moreover, class 8 is identified by another traffic set to a default value, on which a DSCP value of 000010 is set. In this case, the DSCP values can be recognized between the home router 103 and the edge router 101, which can be set to different values by the network manager. Further, in the embodiment of the present invention, each DSCP value having a Most Significant Bit (MSB) of "1" represents the guaranteed service or high priority, while each DSCP value having a MSB of "0" represents the best-effort service or low priority.

Further, in the case of downstream traffic, classes 1 and 2 are identified by protocols, on which allocation rates of 30% and 10% are set, respectively. Further, class 3 is identified by a transmission IP address, on which an allocation rate of 10% is set. Further, class 4 is identified by another traffic set to a default value, on which an allocation rate of 50% is set.

Further, the user can select one among three options, such as default, standard and extension, with respect to upstream and downstream traffic. A default option is used to treat all traffic as the same class and transmit the traffic within a range of Max BW of the service provider. A standard option is used to divide traffic into real-time traffic and non real-time traffic, and allow a ratio of the real-time traffic to the non real-time traffic to be set depending on the traffic use pattern of the user. An extension option is used to set traffic in flows, such as a transmission IP/port or reception IP/port, to set traffic in protocols through the use of a well-known port, etc., and to allow the user to arbitrarily change the priorities of classes. Further, the classes of upstream and downstream traffic are independently set, and not influenced by each other.

TABLE 1

Example of setting of packet priorities

| Priority | Protocol | Tran IP address | Tran port | Rec IP address | Rec port | Alloc Rate | DSCP |
|---|---|---|---|---|---|---|---|
| Upstream traffic | | | | | | | |
| 1 | RTP | — | — | — | — | 30 | 100001 |
| 2 | SNMP | — | — | — | — | 10 | 100010 |
| 3 | — | 129.254.10.2 | — | — | — | 10 | 100011 |
| 4 | — | 129.254.20.2 | — | — | — | 10 | 100101 |
| 5 | — | — | 500 | — | — | 10 | 000110 |
| 6 | — | — | 600 | — | — | 10 | 000111 |
| 7 | — | — | 700 | — | — | 10 | 001001 |
| 8 | Default | — | — | — | — | 10 | 000010 |
| Downstream traffic | | | | | | | |
| 1 | RTP | — | — | — | — | 30 | — |
| 2 | SNMP | — | — | — | — | 10 | — |
| 3 | — | 129.254.10.2 | — | — | — | 10 | — |
| 4 | Default | — | — | — | — | 50 | — |
| 5 | — | — | — | — | — | — | — |
| 6 | — | — | — | — | — | — | — |
| 7 | — | — | — | — | — | — | — |
| 8 | — | — | — | — | — | — | — |

* Tran IP address: Transmission IP address, Tran port: Transmission port, Rec IP address: Reception IP address, Rec port: Reception port, Alloc rate: Allocation rate FIG. 3 is a view showing the detailed construction of the edge router according to an embodiment of the present invention.

Figure 3:
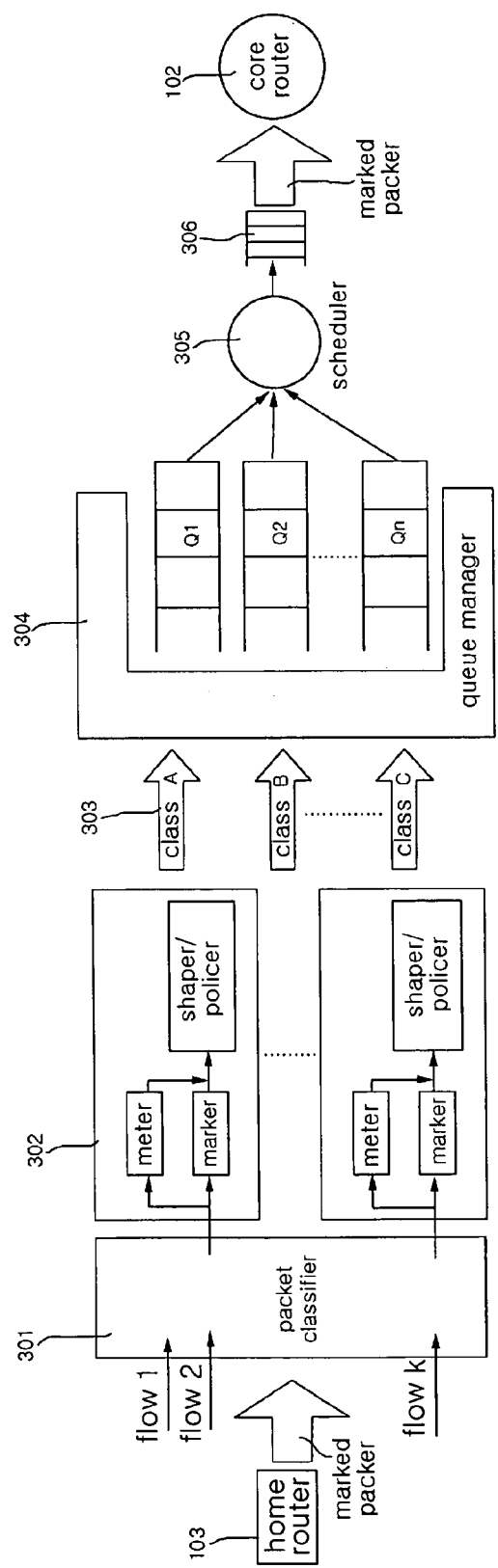
FIG. 3 is a view showing the detailed construction of an edge router according to an embodiment of the present invention.

Referring to FIG. 3, the edge router 101 of the present invention includes a packet classifier 301, packet controllers 302, class queues 303, a queue manager 304, a scheduler 305 and an output queue 306. The edge router 101 processes traffic (packets) marked by the home router 103 through the following construction and operation.

The packet classifier 301 classifies packets, on which DSCP values set by the network manager are marked and which flow from the home router 103, depending on pre-defined policies. The packet classifier 301 is constructed to be capable of identifying guaranteed service (or high priority) packets and best-effort service (or low priority) packets preset by the home router 103, thus guaranteeing the quality of traffic promised to the user. The packet controllers 302 can mark again previously marked packets as DPSK values used in a region between the home router 103 and the edge router 101 or the external network 100, through the use of a marker included in the packet controller 302. Further, the packet controllers 302 can perform traffic control, such as policing, shaping and metering, using a policer, a shaper and a meter, which are included in each of the packet controllers 302. This traffic control is valid when DSCP contracted between network service providers or DSCP proposed in standards is used. The class queues 303 (class A, class B and class N) of the edge router 101 can be implemented using a minimum of 8 to a maximum of 1024 queues. The class queues 303 are managed by the queue manager 304, and traffic stored in the class queues 303 is provided according to priorities by the scheduler 305 and then transmitted to the output queue 306. Further, the traffic marked again by the edge router 101 in this way is transmitted to the core router 318 so that the traffic can be processed within the network 100.

Figure 4A:
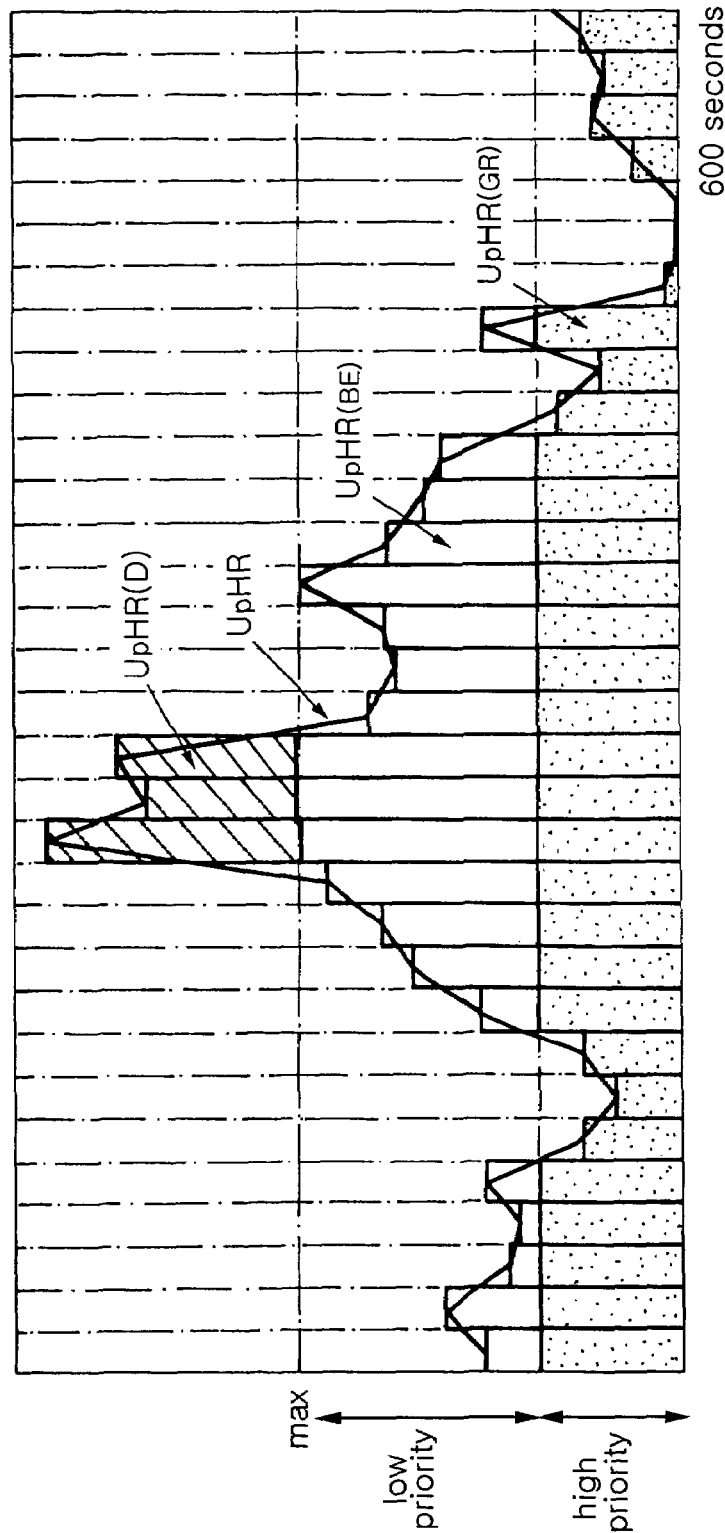
FIGS. 4a and 4b are graphs showing results obtained by monitoring traffic in the home router according to the present invention.
Figure 4B:
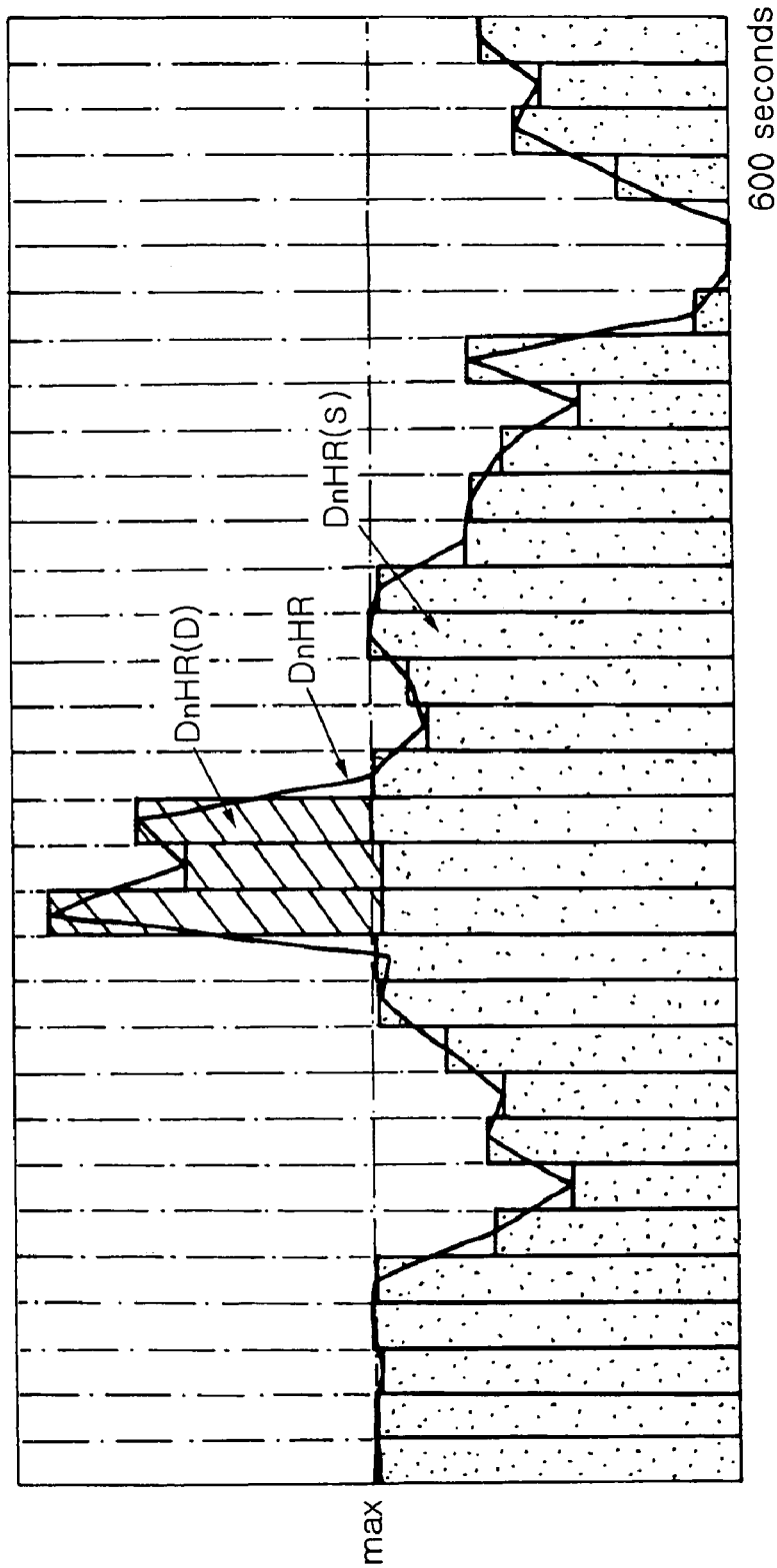

FIGS. 4a and 4b are graphs showing results obtained by monitoring traffic in the home router according to an embodiment of the present invention.

The system according to the embodiment of the present invention further includes a means capable of collecting statistical data for upstream and downstream traffic passing through the home router 103. The collected data can be shown to the user through the Web, or transmitted to the network manager. In order to collect throughput source data for the upstream and downstream traffic, the home router 103 collects upstream and downstream traffic throughput for one recent period (for example, 600 seconds) with the period being set to a specific time (a basic value: one second). The traffic throughput collected for one period is provided to the user through the Web. Further, a period at which traffic throughput is collected is a parameter, which can be changed according to system performance and use a value recommended by the network manager. Further, a period at which the home router 103 monitors traffic throughput is also a parameter, which can be changed according to the environment and use a value recommended by the network manager.

When the measurement for the upstream traffic is performed, the following parameters can be used.

the amount of traffic marked with "guaranteed service or high priority" and transmitted to higher network: UpHR (GR)

the amount of traffic marked with "best-effort service or low priority" and transmitted to higher network: UpHR (BE)

the amount of traffic not transmitted to higher network but dropped: UpHR(D)

If a parameter UpHR is expressed in terms of the total amount of traffic, generated by the home router, using the above parameters, that is, UpHR(GR), UpHR(BE) and UpHR(D), the following Equation [1] can be obtained, where UpHR(S) is the total amount of traffic serviced at the home router.

$$UpHR=UpHR(GR)+UpHR(BE)+UpHR(D)\ UpHR(S)= UpHR(GR)+UpHR(BE) \quad [1]$$

Further, the following parameters can be used for the measurement of the downstream traffic.

the amount of traffic transmitted to lower IP terminals: DnHR(S)

the amount of traffic not transmitted to lower IP terminals, but dropped: DnHR(D)

If a parameter DnHR is expressed in terms of the total amount of traffic flowing into the home router 103 using the above parameters DnHR(S) and DnHR(D), the following Equation [2] can be obtained.

$$DnHR=DnHR(S)+DnHR(D) \quad [2]$$

FIGS. 4a and 4b are graphs showing results obtained by monitoring traffic in the home router according to an embodiment of the present invention.

In the embodiment of the present invention, the conditions of upstream and downstream traffic monitored for one recent period (for example, 600 seconds) can be displayed through a Web interface, and shown to the user terminal on the basis of the displayed traffic conditions.

FIG. 4a is a graph showing the results obtained by monitoring upstream traffic generated by the home router 103 of the present invention. Referring to FIG. 4a, the amount of traffic UpHR(GR) with high priority provided by guaranteed services, and the amount of traffic UpHR(BE) with low priority provided by best-effort services, and the amount of traffic UpHR(D) not transmitted to a higher network, but dropped, are shown in the graph. Further, a curve for indicating the total amount of traffic UpHR generated by the home router 103 is also shown in the graph.

FIG. 4b is a graph showing the results obtained by monitoring downstream traffic in the home router 103 of the present invention. Referring to FIG. 4b, the amount of traffic DnHR(S) transmitted to lower IP terminals and the amount of traffic DnHR(D) not transmitted to lower IP terminals, but dropped, are shown in the graph. Further, a curve for indicating the total amount of traffic DnHR flowing into the home router 103 is shown in the graph.

In FIGS. 4a and 4b, "−1" is used as a delimiter, "−2" is used as the last of data and then data is delimited while upstream and downstream data are transmitted in a bundle of five pieces of data for each period. At this time, the following expressions can be used.

UpHR(GR)t-599, UpHR(BE)t-599, UpHR(D)t-599, DnHR(S)t-599, DnHR(D)t-599, −1,

UpHR(GR)t-598, UpHR(BE)t-598, UpHR(D)t-598, DnHR(S)t-598, DnHR(D)t-598, −1,

, . . . ,

UpHR(GR)t, UpHR(BE)t, UpHR(D)t, DnHR(S)t, DnHR(D)t, −1,−2

If a time for which the measurement is performed does not correspond to one period, an amount of data smaller than a bundle of 600 pieces of data can be transmitted, which is determined by the value "−2". At each period after the last data is transmitted, data updated for a recent period is transmitted and is continuously transmitted to the user terminal until the user terminates a Web screen.

As described above, if the collection of data performed for one period (600 seconds) is terminated, data obtained for one recent period is overwritten on the oldest data and prepared to be consistently shown. If the power of the home router 103 is turned off, throughput data of the traffic having been collected may be lost. Therefore, the collected data is stored in a non-volatile memory, so that previous data can be maintained when the home router is rebooted.

The method of guaranteeing QoS of the present invention can be implemented with a computer-readable program recorded on a computer-readable recording medium. In this case, the computer-readable recording medium includes all the types of data recording media in which data readable by a computer system is stored. For example, the computer-readable recording medium may include Read Only Memory (ROM), Random Access Memory (RAM), Compact Disk (CD)-ROM, magnetic tape, floppy disk and optical data storage. Further, the method can be implemented with a carrier wave as in the case of the transmission through the Internet. Further, the computer-readable recording medium is distributed to computer systems connected to each other through a network, so that the computer-readable program may be stored in a distribution manner and executed thereby.

As described above, the present invention provides a system and method for guaranteeing quality of service, in which traffic control functions, such as traffic shaping and policing functions, are distributed to a home router of a subscriber and processed thereby, so that a load to be processed by an edge router is reduced, thus improving the reliability of a guarantee of traffic quality.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for guaranteeing quality of service with respect to packets transmitted/received between an external network capable of providing differentiated services and a home network, comprising:
   a packet classifier for classifying the packets according to addresses and traffic types;
   a marker for allocating information on priorities to packets transmitted from the home network to the external network;
   a priority class queue having a plurality of queues classified according to the priorities;
   a scheduler for servicing packets stored in the priority class queue according to the priorities; and
   a token bucket for dropping packets, bandwidths of which are above a preset maximum bandwidth, when the packets are generated.

2. The system for guaranteeing quality of service according to claim 1, wherein the information on the priorities includes:
   information used to intercept packets, the bandwidths of which are above the maximum bandwidth; and
   information used to necessarily transmit packets, bandwidths of which are equal to or below a minimum bandwidth to a correspondent user so as to provide guaranteed services.

3. The system for guaranteeing quality of service according to claim 2, wherein:
   the packets include upstream packets transmitted from the home network to the external network and downstream packets transmitted from the external network to the home network;

the upstream packets have information related to the maximum bandwidth or minimum bandwidth; and the downstream packets have information related to the maximum bandwidth.

4. The system for guaranteeing quality of service according to claim 3, wherein the downstream packets for guaranteed services are implemented so that, if a bandwidth of a sum of the downstream packets is above the downstream maximum bandwidth, use of a specific application is stopped and then the bandwidth of the sum of the downstream packets is controlled to be equal to or below the downstream maximum bandwidth.

5. The system for guaranteeing quality of service according to claim 1, wherein the information on the priorities includes information used to identify a protocol, a transmission IP address, a transmission port or a default value.

6. The system for guaranteeing quality of service according to claim 1, wherein the information on the priorities is included in Differentiated Services Code Point (DSCP) codes.

7. The system for guaranteeing quality of service according to claim 1, further comprising an edge router for examining the priority information allocated by the marker and then transmitting the packets to a core router according to the priorities.

8. The system for guaranteeing quality of service according to claim 1, further comprising means for providing information of traffic processed for a predetermined period to a user through the Web.

9. The system for guaranteeing quality of service according to claim 8, wherein the means includes so as to monitor states of upstream traffic transmitted from the home network to the external network:

means UpHR(GR) for representing an amount of traffic marked with a guaranteed service and transmitted to the external network;

means UpHR(BE) for representing an amount of traffic marked with a best-effort service and transmitted to the external network;

means UpHR(D) for representing an amount of traffic not transmitted to the external network but dropped;

means UpHR for representing a total amount of traffic generated by the home router; and means UpHR(S) for representing a total amount of traffic serviced at the home router.

10. The system for guaranteeing quality of service according to claim 8, wherein the means includes so as to monitor states of downstream traffic transmitted from the external network to the home network:

means DnHR(S) for representing an amount of traffic transmitted to lower IP terminals;

means DnHR(D) for representing an amount of traffic not transmitted to lower IP terminals, but dropped; and means DnHR for representing a total amount of traffic flowing into the home router.

11. A method of guaranteeing quality of service with respect to packets transmitted/received between an external network capable of providing differentiated services and a home network, comprising the steps of:

classifying packets transmitted from the home network to the external network according to addresses and traffic types;

allocating information on priorities to the packets;

inputting the packets to a priority class queue having a plurality of queues classified according to the priorities;

servicing the packets stored in the priority class queue according to the priorities; and dropping packets, bandwidths of which are above a preset maximum bandwidth, when the packets are generated.

12. The method of guaranteeing quality of service according to claim 11, wherein the information on the priorities includes:

information used to intercept packets, bandwidths of which are above a maximum bandwidth; and information used to necessarily transmit packets, bandwidths of which are equal to or below a minimum bandwidth, to a correspondent user so as to provide guaranteed services.

13. The method of guaranteeing quality of service according to claim 11, wherein:

the packets include upstream packets transmitted from the home network to the external network and downstream packets transmitted from the external network to the home network;

the upstream packets have information related to a maximum bandwidth or minimum bandwidth; and the downstream packets have information related to a maximum bandwidth.

14. The method of guaranteeing quality of service according to claim 13, further comprising the step of stopping using a specific application and then controlling a bandwidth of a sum of the downstream packets for guaranteed services to be equal to or below the downstream maximum bandwidth if the bandwidth of the sum of the downstream packets is above the downstream maximum bandwidth.

15. The method of guaranteeing quality of service according to claim 11, wherein the information on the priorities includes information used to identify a protocol, a transmission IP address, a transmission port or a default value.

16. The method of guaranteeing quality of service according to claim 11, wherein the information on the priorities is included in Differentiated Services Code Point (DSCP) codes.

17. The method of guaranteeing quality of service according to claim 11, further comprising the step of providing information of traffic processed for a predetermined period to a user through the Web.

* * * * *